United States Patent
Meguro et al.

(10) Patent No.: US 6,538,847 B2
(45) Date of Patent: Mar. 25, 2003

(54) MAGNETIC HEAD HAVING SEPARATED UPPER MAGNETIC CORES FOR AVOIDING MAGNETIC SATURATION AND MANUFACTURING METHOD OF SAME

(75) Inventors: Satoshi Meguro, Hinode-machi (JP); Shigeo Fujii, Kumagaya (JP); Hiroyuki Mima, Mashiko-machi (JP); Toshihiro Ifuka, Tottori (JP)

(73) Assignee: Hitachi Metals, Ltd., Tokyo (JP)

( * ) Notice: Subject to any disclaimer, the term of this patent is extended or adjusted under 35 U.S.C. 154(b) by 83 days.

(21) Appl. No.: 09/764,351

(22) Filed: Jan. 19, 2001

(65) Prior Publication Data

US 2001/0015872 A1 Aug. 23, 2001

(30) Foreign Application Priority Data

Feb. 22, 2000 (JP) ......................... 2000-043955

(51) Int. Cl.$^7$ .............................................. G11B 5/147
(52) U.S. Cl. .................................................. 360/126
(58) Field of Search ............................................ 360/126

(56) References Cited

U.S. PATENT DOCUMENTS 6,163,436 A * 12/2000 Sasaki et al. ............... 360/123
6,388,845 B1 * 5/2002 Sasaki ........................ 360/126
6,414,824 B1 * 7/2002 Sasaki ........................ 360/126

FOREIGN PATENT DOCUMENTS

JP  11-154307  8/1999
JP  11-213331  8/1999

* cited by examiner

Primary Examiner—Robert S. Tupper (57) ABSTRACT

An inductive magnetic head used for high-density recording having such a construction that prevents magnetic leakage near a magnetic pole at the tip of the magnetic core and reduces magnetic resistance or reluctance at an upper magnetic core front portion is disclosed. An upper magnetic core facing a lower magnetic core with a non-magnetic gap layer interposed therebetween comprises an upper magnetic core front portion near a magnetic pole, and an upper magnetic core rear portion at the rear portion. The front portion has a parallel portion having a width almost equal to the track width extending from the magnetic pole toward the rear end of the front portion, and a sector at the rear of an apex. The front portion has a non-magnetic gap with the lower magnetic core at an area between the magnetic pole and the apex, and the gap between the front portion and the lower magnetic core is wider than the magnetic gap at the rear of the apex. The tip portion of the upper magnetic core rear portion is overlapped and connected to the upper magnetic core front portion on the medium-facing surface side of the apex, extending therefrom to the upper part of a coil and a coil insulating layer.

1 Claim, 4 Drawing Sheets

MAGNETIC HEAD HAVING SEPARATED UPPER MAGNETIC CORES FOR AVOIDING MAGNETIC SATURATION AND MANUFACTURING METHOD OF SAME

BACKGROUND OF THE INVENTION

1. Field of the Invention

The present invention relates generally to a high-density recording magnetic head, and more particularly to a magnetic core construction for inductive magnetic heads used for recording information on a high-density recording magnetic disk.

2. Description of the Related Art

A most commonly used magnetic head for magnetic disk drives is a combination of inductive magnetic and magnetoresistive heads in which the inductive magnetic head records information on a magnetic recording medium in a magnetic disk drive, while the magnetoresistive head reads the information recorded on the magnetic recording medium. As the magnetoresistive head, laminated layers of a magnetoresistive element, such as Ni—Fe, and a conductive SAL (soft adjacent layer), with a layer of material having a relatively large electrical resistance, such as Ta interposed between them are used. The magnetoresistive element is longitudinally magnetized by applying a static magnetic field to the three-layer laminate in the longitudinal direction. When a sensing current is caused to flow in the three layers in the longitudinal direction, a magnetic field is produced around the SAL by the current shunted in the SAL. The magnetic field thus produced changes the magnetization angle in the magnetoresistive element to approximately 45 degrees with respect to the longitudinal direction. When this magnetoresistive element is disposed facing the magnetic recording medium, the magnetization angle of the magnetoresistive element is changed by the magnetic information in the magnetic recording medium. Since the electrical resistance of the magnetoresistive element layer to the sensing current changes in accordance with the change in the angle, the magnetic information in the magnetic recording medium can be read.

There is a spin-bulb type in the magnetoresistive head. In the spin-bulb magnetoresistive head, two, ferromagnetic thin films are laminated with a non-magnetic thin film interposed between them, and one of the ferromagnetic thin films is disposed adjoining an anti-ferromagnetic thin film, with the magnetization direction in the ferromagnetic thin film being pinned, and the magnetization angle in the other ferromagnetic thin film being allowed to be in a free state. When this magnetoresistive head is disposed facing the magnetic recording medium, the magnetization angle in the ferromagnetic thin film that is kept in a free state changes in accordance with the magnetic information stored in the magnetic recording medium. This magnetization direction relatively changes with the fixed magnetization in the other ferromagnetic thin film. As the relative magnetization direction in the ferromagnetic thin films on both sides of the non-magnetic thin film changes, the electrical resistance to the sensing current flowing in the non-magnetic thin film also changes, and as a result, the magnetic information stored in the magnetic recording medium can be read.

Typical magnetoresistive heads commonly used for reading information in this manner include a type using the magnetoresistive effective element, and that using the spin bulb, but heads of constructions other than these are also being used to read magnetic information from the magnetic recording medium.

As a magnetic head used with magnetic recording media for magnetic disk drives, a composite magnetic head comprising a laminate of a magnetoresistive head and an inductive magnetic head, as described above, is formed on a head slider. On a head slider made of nonmagnetic insulating ceramic material provided is a magnetoresistive head between upper and lower shields with an insulating thin film interposed between them. The upper shield also serves as a lower magnetic core for the inductive magnetic head, on which an upper magnetic core is provided; the tips of the lower and upper magnetic cores forming magnetic poles of the inductive magnetic head. The magnetic poles of the inductive magnetic head and the magnetoresistive element are provided facing the air bearing surface, that is, a surface facing the magnetic recording medium of the head slider. A magnetic path is formed by the upper and lower magnetic cores of the inductive magnetic head, and an induction (or exciting) coil is wound in such a manner as to surround the magnetic path.

The lower magnetic core of the inductive magnetic head has an almost flat construction, and a non-magnetic gap layer comprising an insulating thin film, such as alumina, is formed over almost the entire surface of the lower magnetic core. On the non-magnetic gap layer formed are an insulating resin layer, a coil and another insulating resin layer enclosing the coil, on which an upper magnetic core is formed. The upper magnetic core is provided directly on the non-magnetic gap layer in an area which serves as a magnetic pole, directly on the lower magnetic core in an area where the upper magnetic core is connected to the lower magnetic core, and on a laminate of the coil and the insulating resin layer in a back area between the magnetic poles and the connecting part. When a photoresist mask is formed to provide an upper magnetic core in an area where there is a level difference as high as 6 to 20 $\mu$m, as found in the back area between the magnetic poles and the connecting part, patterning errors could unwantedly increase to an extent not suitable for forming narrow-track magnetic poles for high-density recording.

To cope with this, a construction has been proposed where the upper magnetic core is formed by dividing it into a front portion near the magnetic poles and a rear portion near the back area; the front portion formed directly on the non-magnetic gap layer and the rear portion formed extending from an upper surface of the front portion and over the coil and a coil insulating layer covering the coil. In this construction, the upper magnetic core front portion usually has a reduced width almost equal to a track width at the magnetic poles, that is, on a surface facing the recording medium, or a medium-facing surface; the width becoming gradually wider into a sectoral shape as the upper magnetic core goes far from the medium-facing surface. To obtain an accurate gap depth, an apex is provided on a surface facing the gap near the magnetic pole tips, and an area of the gap-facing surface of the upper magnetic core front portion from the medium-facing surface to the apex constitutes a magnetic gap with the lower magnetic core on the non-magnetic gap layer; an area at the rear of the apex being formed on another insulating layer overlapping the non-magnetic gap layer. With this construction, leakage flux between the upper and lower magnetic cores is reduced in the area at the rear of the apex on the upper magnetic core front portion.

Although the upper magnetic core rear portion is provided with a tip thereof connected to the upper magnetic core front portion, the tip of the upper magnetic core rear portion is formed at an area as remote as possible from the medium-facing surface to prevent leakage flux from the tip of the upper magnetic core rear portion to a recording medium, thereby preventing incidental erase.

In the manufacture of magnetic heads, a magnetic gap depth is provided by polishing the air-bearing surface of the composite magnetic head laminated on the head slider. With the entire upper magnetic core front portion formed into a sectoral shape, as described above, the track width tends to change depending on the polishing depth in polishing the air-bearing surface. With the front portion formed into a sectoral shape, a slight deviation of the polishing depth from a predetermined value could result in a change in the track width. To cope with the difficulty in controlling the track width to a desired value, a method of controlling the track width regardless of the machining depth of the air-bearing surface has been practiced by using a rectangular upper magnetic core front portion.

As described above, an apex is provided near the surface facing the recording medium on the upper magnetic core front portion, and the thickness of the upper magnetic core front portion is reduced in the area at the rear of the apex. In addition to this, the cross-sectional area near the rear end of the upper magnetic core front portion can be reduced to a smaller size by forming the upper magnetic core front portion into a rectangle of a size almost equal to the track width. The tip of the upper magnetic core rear portion is overlapped with the area where the cross-sectional area of the upper magnetic core front portion is reduced. Magnetic heads having such a construction tend to increase magnetic resistance or reluctance because magnetic saturation occurs in the upper magnetic core front portion, leading to unwanted magnetic leakage. In this Specification, magnetic resistance or reluctance means resistance or reluctance to magnetic flux flowing in a material having the resistance or reluctance, while magnetoresistance means electrical resistance caused or changed in a material applied to by a magnetic field.

SUMMARY OF THE INVENTION

It is therefore an object of the present invention to provide a magnetic head that can improve writing efficiency by forming the track width into a desired value regardless of the gap depth and lowering the magnetic resistance or reluctance.

The magnetic head according to the present invention comprises:
  a lower magnetic core,
  a non-magnetic gap layer formed on the lower magnetic core,
  an insulating layer formed on the non-magnetic gap layer,
  a coil formed on the insulating layer,
  a coil insulating layer covering the coil, and
  an upper magnetic core formed on the non-magnetic gap layer, the insulating layer and the coil insulating layer, the coil surrounding a magnetic path made of both the lower and upper magnetic cores;
  the upper magnetic core comprising an upper magnetic core front portion extending from a medium-facing surface of the magnetic head to an upper surface of the non-magnetic gap layer and the insulating layer, and an upper magnetic core rear portion having a front tip thereof overlapped at a location remote from the medium-facing surface on an upper surface of the upper magnetic core front portion and being formed beginning from the front tip and extending over the coil insulating layer. The upper magnetic core front portion has an apex on a boundary of the upper magnetic core front portion with the insulating layer closest to the medium-facing surface on the non-magnetic gap layer, and sandwiches the non-magnetic gap layer with the lower magnetic core on the side closer to the medium-facing surface side the apex and the non-magnetic gap layer and the insulating layer with the lower magnetic core on the rear side of the apex. The upper magnetic core front portion further has both side walls parallel to each other in the track width direction close to the medium facing surface, and on the insulating layer a sector whose width in the track width direction increases from the parallel width. The front tip of the upper magnetic core rear portion overlapping the upper magnetic core front portion is located on the medium-facing surface side of the apex of the upper magnetic core front portion.

A magnetic pole column made of the same material as the upper magnetic core front portion may be provided between the upper magnetic core rear portion and the lower magnetic core.

In the magnetic head according to the present invention, it is preferable that the insulating layer should have a front insulating layer and a rear insulating layer; the front insulating layer being overlapped by the upper magnetic core front portion. And the coil and the coil insulating layer are formed on the rear insulating layer.

In the magnetic head according to the present invention, the sectoral portion or sector of the upper magnetic core front portion should preferably be at the rear of the apex.

In the magnetic head according to the present invention, furthermore, the front tip of the upper magnetic core rear portion overlapping the upper magnetic core front portion should preferably be wider and thicker than the upper magnetic core front portion.

Furthermore, the magnetic head according to the present invention should preferably be formed on a slider made of a non-magnetic ceramic substrate, particularly on the trailing end surface thereof; recesses, recesses for attitude control, for example, being provided on the medium-facing surface, the upper magnetic core front portion exposed to the medium-facing surface and the front tip of the upper magnetic core rear portion exposed to the bottoms of the recesses. The recesses should preferably be FEAB (free etching air bearing) shallow recesses. The term "exposed" used herein means that the end face of the upper magnetic core front portion is flush with the medium-facing surface, and the end face of the front tip of the upper magnetic core rear portion is flush with the bottom of the recess.

The manufacturing method of a magnetic head comprises:
  providing a slider made of a non-magnetic ceramic substrate, and
  forming, in sequence on the slider, a lower magnetic core, a non-magnetic gap layer on the lower magnetic core, an insulating layer for regulating an apex on the non-magnetic gap layer, a coil on an insulating layer continuing from the insulating layer for regulating the apex, a coil insulating layer covering the coil, an upper magnetic core front portion extending from a medium facing surface of the magnetic head and on the non-magnetic gap layer and the insulating layer for regulating the apex, and
  an upper magnetic core rear portion having a front tip on the upper magnetic core front portion and extending from the front tip and on the coil insulating layer. The method further comprises:

depositing a magnetic layer for the upper magnetic core rear portion extending over the upper magnetic core front portion and on the coil insulating layer to reach at least the medium facing surface of the magnetic head, and on dry-etching the medium facing surface of the slider to form FEAB shallow recesses, dry-etching the front tip of the magnetic layer from the medium facing surface by the depth of the FEAB shallow recesses to form the upper magnetic core rear portion.

The upper magnetic core rear and front portions can be formed without increasing the number of process by providing FEAB shallow recesses pattern with a pattern for removing the front tip of the upper magnetic core rear portion on a photoresist mask for forming the FEAB shallow recesses Not only the FEAB shallow recesses, deep recesses, or a combination of shallow and deep recesses may be provided. Dry etching should preferably be carried out using an ion milling equipment.

After the front tip of the upper magnetic core rear portion is dry-etched from the medium-facing surface to almost the depth of the FEAB shallow recesses, a medium-facing surface protective film of diamond-like carbon, etc. should preferably be provided on the entire medium-facing surface of the slider. By machining the front tip of the upper magnetic core rear portion simultaneously with the machining of the FEAB shallow or deep recesses, the front tip is made exposed to an area remote from the medium-facing surface. In such a case, however, the front tip can be prevented from being corroded because the entire surface is covered with a protective film to shield the surface from the air.

BRIEF DESCRIPTION OF THE DRAWINGS

A magnetic head according to the present invention will be described in the following, referring to the accompanied drawings in which.

DESCRIPTION OF THE PREFERRED EMBODIMENTS

EXAMPLE 1

Figure 1:
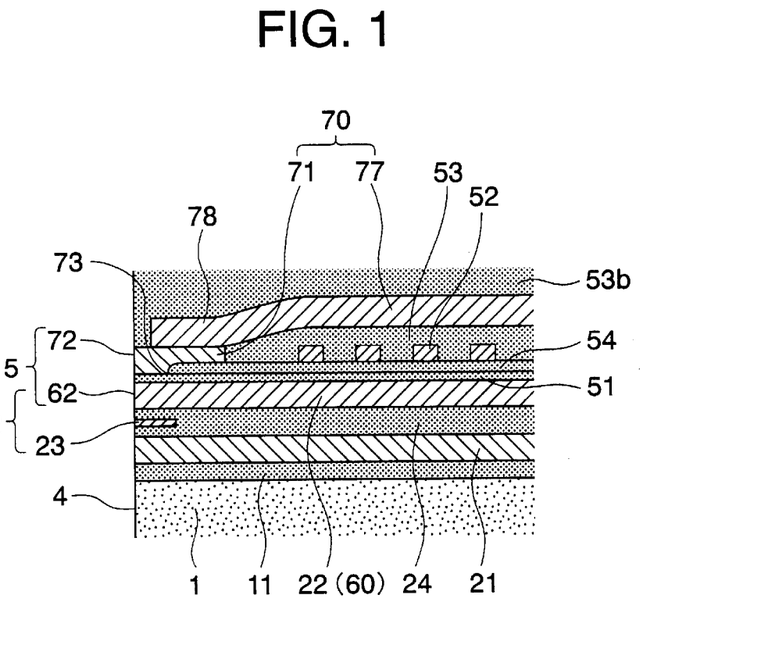
FIG. 1 is a cross-sectional view of a magnetic head embodying the present invention.
Figure 2:
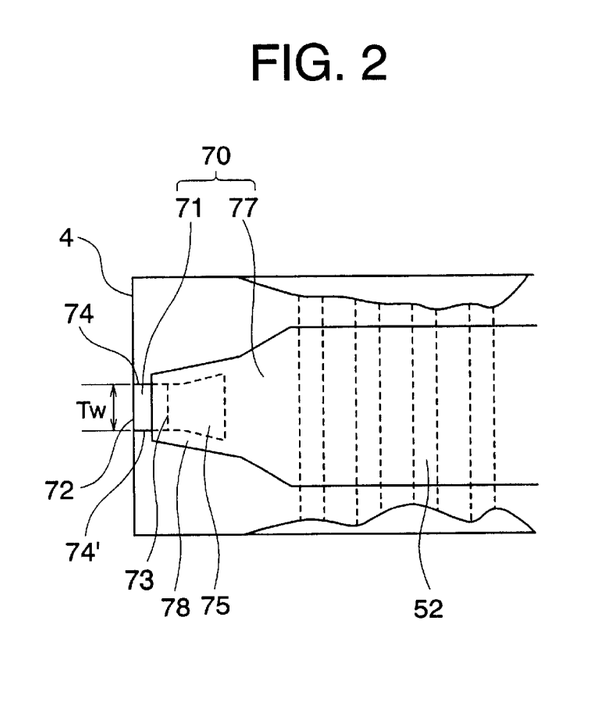
FIG. 2 is a plan view of the magnetic head embodying the present invention, seen from the side of the upper magnetic core thereof.

In FIGS. 1 and 2, reference numeral 1 refers to a non-magnetic ceramic substrate, made of alumina titanium carbide, for example, constituting a head slider. On the trailing end surface of the slider provided are a laminate of a magnetoresistive head 2 and an inductive magnetic head 5. In this Specification, the inductive magnetic head is simply called the magnetic head for convenience sake. Both the magnetoresistive head and the inductive magnetic head may be collectively called the magnetic head in some cases.

The magnetic head 2 is formed on an insulating layer 11 provided on the ceramic substrate 1. A magnetoresistive element 23 is sandwiched between lower and upper shields 21 and 22 with an insulating layer 24 interposed between them. There are a magnetoresistive element type, a spin-bulb type, etc. in the magnetoresistive element 23. In this description, leads for feeding a sensing current has been omitted. The magnetoresistive element 23 is provided in close vicinity to an air-bearing surface, that is, a surface 4 facing a magnetic recording medium. The magnetic head is covered with a protective material 53b.

In this embodiment, the upper shield 22 also serves as a lower magnetic core 60 of the magnetic head 5; the lower magnetic core 60 and the upper magnetic core 70 being connected at their respective rear ends (not shown), constituting a magnetic path of the magnetic head 5. The upper shield 22 is a NiFe-plated film formed into a thickness of about 3 μm. A non-magnetic gap layer 51 is provided between the lower and upper magnetic cores 60 and 70. Ends of these cores near the medium-facing surface 4 constitute magnetic poles 62 and 72 of the magnetic head 5. The non-magnetic gap layer is a 0.311 μm-thick alumina sputtered film. An (exciting) coil 52 is wound on an area enclosed by the lower and upper magnetic cores 60 and 70 in such a manner as to surround the magnetic path. The coil 52 is a 2 μm-thick Cu-plated film insulated with coil insulating layers 53, made of an insulating resin, interposed between the upper and lower magnetic cores 70 and 60, and between the coils 52. The insulating resin layer is of a film thickness of 1 to 3 μm formed by baking at 230° C. after a photoresist is applied. When a signal current is fed to the coil 52, a magnetic field is produced between the magnetic poles, and thereby an information signal is recorded on a medium facing the magnetic poles.

The upper magnetic core 70 comprises an upper magnetic core front portion 71 facing the lower magnetic core 60 at the medium-facing surface 4 via the non-magnetic gap layer 51, and an upper magnetic core rear portion 77 having a tip portion overlapped with the upper magnetic core front portion 71, and extending therefrom to a core connecting portion. The upper magnetic core is a 2 μm-thick CoNiFe-plated film. The width of the upper magnetic core front portion at the surface facing the medium, that is, the track width is set to 0.8 μm.

The upper magnetic core front portion 71 has a magnetic pole 72 at the medium-facing surface 4, and extends from the magnetic pole 72 to the proximal portion thereof forming an about rectangular shape whose thickness is reduced from the middle portion. The front end of the upper magnetic core front portion 71 faces the lower magnetic core 60 at an area near the magnetic pole 72 via the non-magnetic gap layer 51; a portion between the front end 71 and the lower magnetic core 60 forming a magnetic gap. Since the insulating layer 54 extends on the non-magnetic gap layer 51 from a location remote from the medium-facing surface 4, the upper magnetic core front portion 71 formed continuously thereon has an apex 73 at an interface of the non-magnetic gap layer 51 and the insulating layer 54, that is, at a tip portion of the insulating layer 54 nearest to the surface facing the medium. The upper magnetic core front portion 71 has a gap larger than the magnetic gap between the upper magnetic core front portion 71 and the lower magnetic core 60 at a location at the rear of the apex 73, and the area from the magnetic pole 72 to the apex 73 is a gap depth. The gap depth is approximately 1.0 μm, and the portion of the upper magnetic core front portion 71 at the rear of the apex 73 usually extends longer than the gap depth. But virtually no magnetic leakage is caused at the area at the rear of the apex 73 because there is a larger gap between the area and the lower magnetic core 60 than the magnetic gap.

The planar shape of the upper magnetic core front portion 71 having the magnetic pole 72 of a track width Tw at the medium-facing surface 4 has side walls 74 and 74' extending in parallel from the magnetic pole, as shown in FIG. 2. The upper magnetic core front portion 71 has a sectoral portion 75 at a location in rear of the parallel portion of both side walls 74 and 74', that is, at a location remote from the medium-facing surface 4. Since a tip portion 78 of the upper magnetic core rear portion 77 on the side of the medium-facing surface 4 is mounted on both the parallel portion and the sectoral portion of the upper magnetic core front portion 71, the magnetic resistance or reluctance between them is reduced by increasing the contact area between the upper magnetic core front portion 71 and the upper magnetic core rear portion 77.

It is desirable that the sectoral portion 75 of the upper magnetic core front portion 71 should be located behind the apex 73. Since the upper magnetic core front portion 71 has a larger gap than the magnetic gap between the upper magnetic core front portion 71 and the lower magnetic core 60 at a location at the rear of the apex 73, magnetic leakage can be reduced by providing a larger gap between the sectoral portion 75 and the lower magnetic core 60.

The upper magnetic core rear portion 77, whose tip portion 78 is overlapped and connected to the upper magnetic core front portion 71, extends backward from that portion, passes over the coil insulating layer 53, and is connected to the lower magnetic core 60 at the rear portion thereof (not shown). The front tip of the tip portion 78 nearest to the medium-facing surface 4 is located on the upper magnetic core front portion 71 on the medium-facing surface side of the apex 73. It is desirable that the tip portion 78 of the upper magnetic core rear portion 77 should be overlapped and connected to a portion of the upper surface of the upper magnetic core front portion 71 ranging from a location ahead of the apex 73 to the rear end of the upper magnetic core front portion 71. The thickness of the upper magnetic core front portion 71 is such that it is thicker on the side nearer to the surface facing the medium with respect to the apex 73, and thinner on the side behind the apex 73. Since the tip portion 78 of the upper magnetic core rear portion 77 comes in contact with the upper magnetic core front portion 71 at the thicker portion from the tip side, that is, from the medium facing surface side to above the apex 73, and also in contact with the sectoral portion 75, the magnetic resistance or reluctance of the upper magnetic core can be reduced. That is, the magnetic leakage in the middle of the upper magnetic core can be controlled because the joint surface area of the upper magnetic core front portion 71 and the upper magnetic core rear portion 77 is larger than that between the upper magnetic core front portion 71 and the non-magnetic gap layer 51.

The tip portion 78 of the upper magnetic core rear portion 77 is withdrawn or remote a little, by 0.1 to 0.5 $\mu$m, for example, from the medium-facing surface 4, and thereby magnetic leakage from this portion to the medium and incidental erase can be prevented.

It is desirable in the present invention that the tip portion 78 of the upper magnetic core rear portion 77 is thicker and wider than the magnetic pole portion, that is, the upper magnetic core front portion. By increasing the thickness and width of the tip portion 78, the magnetic resistance or reluctance at areas where the magnetic resistance or reluctance in the upper magnetic core tends to be increased can be reduced, resulting in a reduction in the magnetic resistance or reluctance of the entire upper magnetic core.

Furthermore, the insulating layer 54 on the non-magnetic gap layer 51 according to the present invention can be made of alumina, which has better thermal conductivity than a resin insulating layer. Since the present invention can have such a construction that the coil 52 is disposed on the alumina insulating layer 54, the heat generated in the coil 52 can be dissipated through the alumina insulating layer 54, thereby preventing the temperature rise of the coil.

In the embodiment described above, a merge type where the upper shield of the magnetoresistive head also serves as the lower magnetic head of the inductive magnetic head has been described, but a piggy-back type where an upper shield and a lower magnetic core of the inductive magnetic head are provided separately can be used to reduce noise.

Since the shape of the upper magnetic core front portion is such that both side walls are parallel and the width between the walls is made almost equal to the track width, there is no fear of the track width fluctuating even by providing a gap depth by machining or polishing the air-bearing surface.

The tip portion of the upper magnetic core rear portion 77 can be withdrawn or remote from the medium-facing surface 4 in the following machining method.

Figure 3:
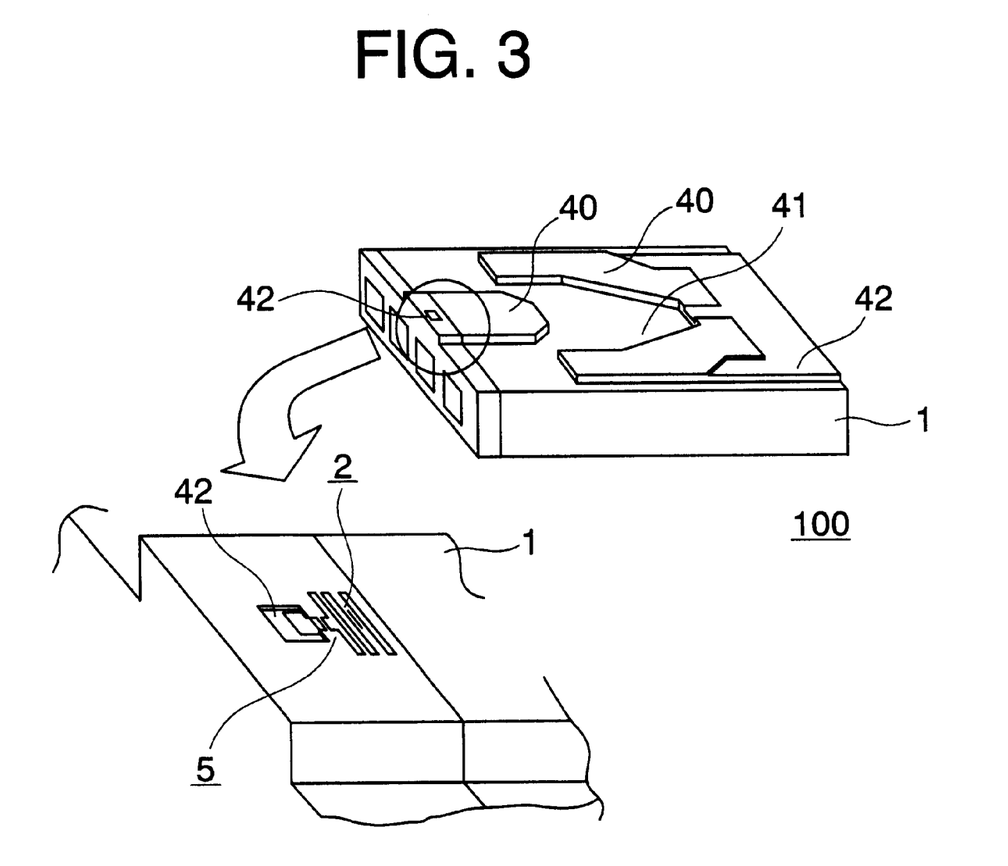
FIG. 3 is a perspective view of a magnetic head slider according to the present invention.

The magnetic head slider is shown in perspective in FIG. 3 with the air-bearing surface turned upside, and an enlarged view of the magnetic head front portion is also shown in the figure. In these figures, numeral 1 refers to a non-magnetic ceramic substrate, made of alumina titanium carbide, constituting a head slider. On the trailing end surface of the slider provided is a laminate of a magnetoresistive head 2 and an inductive magnetic head 5, as described above. On the medium-facing surface 4 formed are a floating surface 40 for generating positive pressure, and a shallow recess 42 and a deep recess 41 for generating negative pressure. The shallow recess 42 is formed in such a manner as to enclose the magnetic poles of the magnetic head 5. The deep recess 41, which is referred to as the FEAB deep recess, has a depth of approximately 1.0 to 2.5 $\mu$m. The shallow recess 42, which is also referred to as the FEAB shallow recess, has a depth of approximately 0.1 to 0.5 $\mu$m. FEAB is an acronym for free-etching air bearing, whose medium-facing surface can be formed with photolithography and dry etching technologies.

Figure 4:
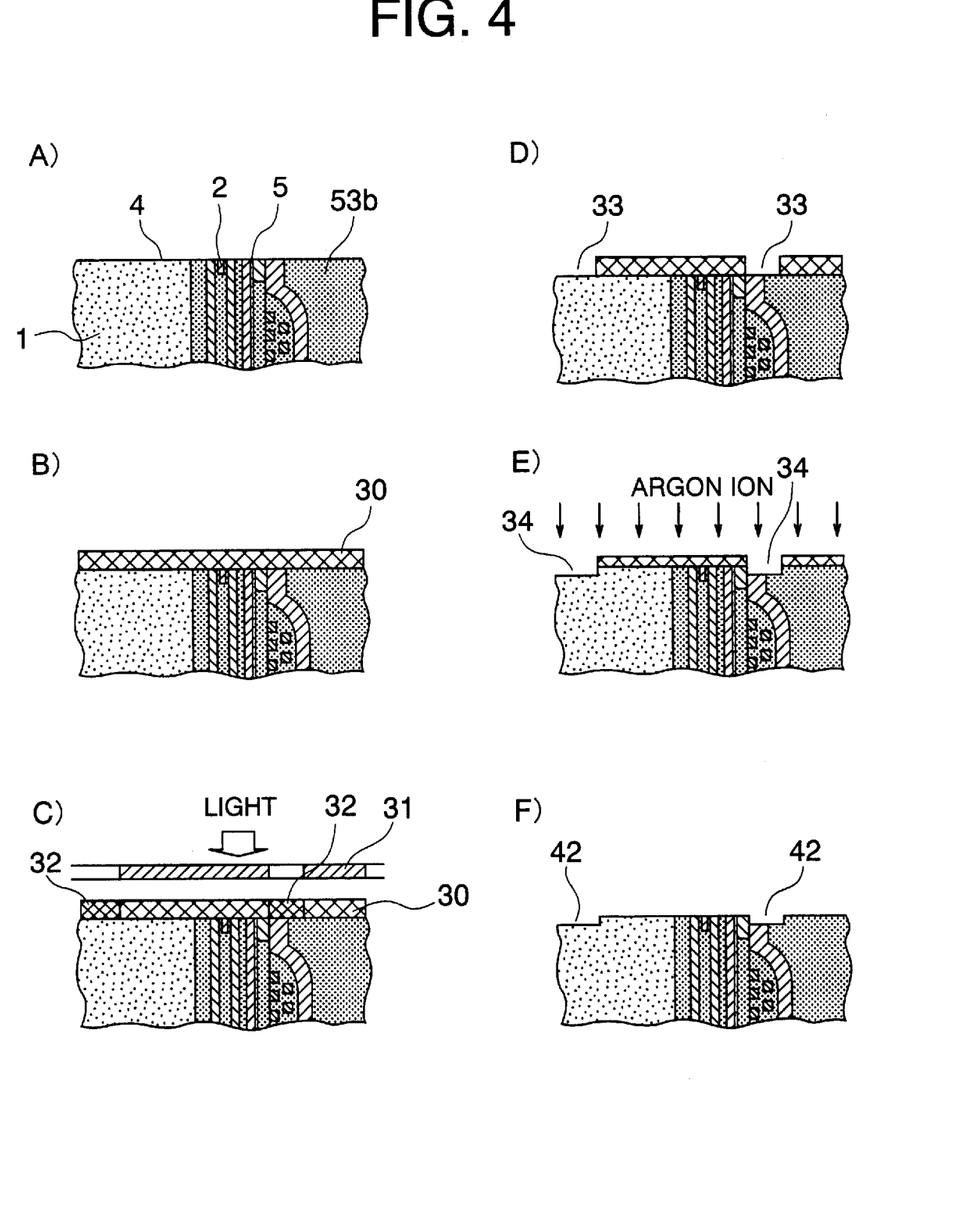
FIGS. 4A through 4F are flow sheets illustrating the FEAB fabricating process.

The magnetic heads to which the present invention is applied are formed in arrays on a disc-shaped non-magnetic ceramic substrate normally having a diameter of 4 to 6 inches. Several thousands or tens of thousands of magnetic heads are formed on a single piece of the non-magnetic ceramic substrate. Description of the manufacturing method of magnetic heads, which is much the same as the generally practiced one, is omitted here. The non-magnetic ceramic disc on which the magnetic heads are formed is cut into row bars (substrate bars cut into a strip shape, on which magnetic heads are arranged in a row), and the medium-facing surfaces of the row bars are mirror finished while controlling the gap depth and subjected to FEAB machining. FIG. 4 explains the FEAB machining process showing as an example the slider cross-section near the magnetic head element. In the figure, numeral 1 refers to a ceramic substrate, and 53b to a protective material. The magnetic head shown is of a piggy-back type. FIG. 4A shows the state where the gap depth is finished into a predetermined size, and the medium-facing surface 4 is mirror finished. The tip portion of the upper magnetic core rear portion is formed extended to the medium-facing surface 4. FIG. 4B shows the state where a photoresist 30 is applied to the medium-facing surface in a thickness about 3 to 5 times the depth of the FEAB shallow recess and baked at about 90° C. The photoresist 30 is applied to a thickness thicker than the depth of the FEAB shallow recess because etching rate in the ion milling of the photoresist is considerably high. Next, the photomask 31 is placed on a predetermined position, and the photoresist 30 is exposed to light. The shaded cross-hatched portion in FIG. 4C is an exposed portion 32. Photoresist apertures 33 as shown in FIG. 4D are formed by removing the exposed portion 32 using a photoresist developer. By impinging argon ions using an ion milling device, shoulders 34 corresponding to the FEAB shallow recesses are formed as shown in FIG. 4E. The depth of the FEAB shallow recess can be controlled by adjusting the duration of the ion milling (dry etching). The FEAB shallow recesses 42 can be formed on the medium-facing surface, with the tip of the upper magnetic core rear portion withdrawn by about 0.1 to 0.5 $\mu$m from the medium-facing surface, as shown in FIG. 4F, by removing the remaining photoresist with an organic solvent, etc. By repeating the processes shown in FIGS. 4A to 4F, the FEAB deep recess 41 (refer to FIG. 3) can be formed. After 0.3 $\mu$m-deep FEAB shallow recesses are formed, 1.5 $\mu$m-deep FEAB deep recesses are formed. Needless to say, the FEAB deep recesses can be formed before the FEAB shallow recesses.

After subjected to the FEAB machining process, a protective film (not shown) of diamond-like carbon (DLC), etc. is formed over the entire medium-facing surface in a thickness of several nanometers to protect the tip portion from moisture and corrosive gases.

EXAMPLE 2

Figure 5:
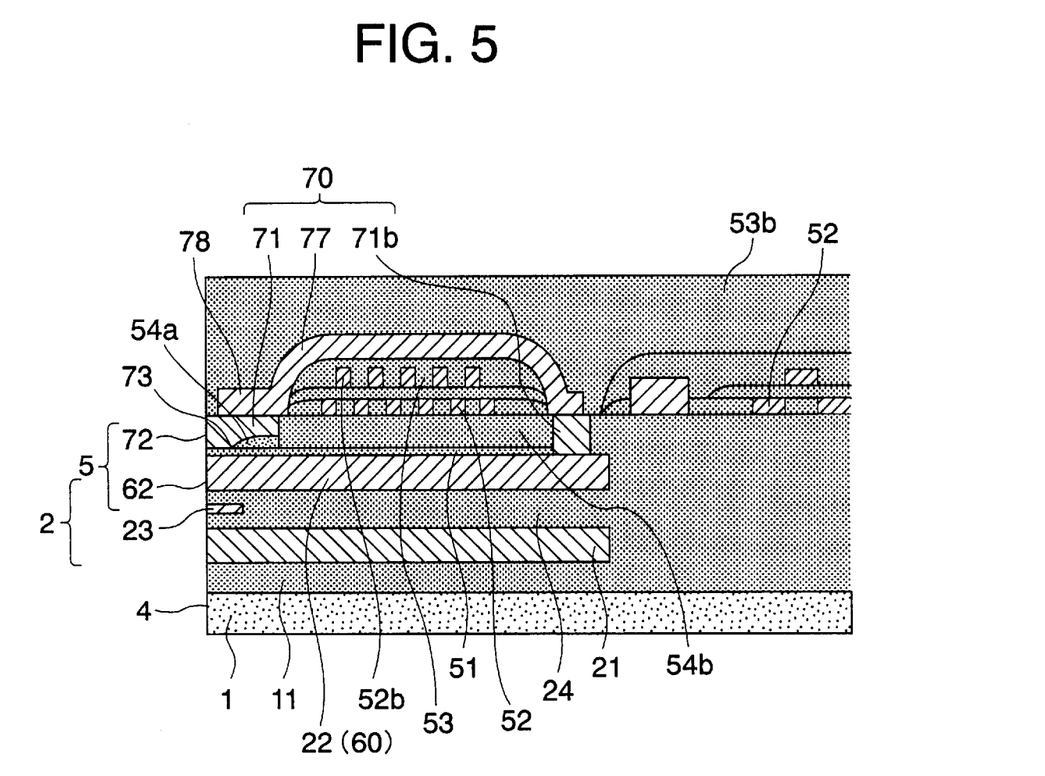
FIG. 5 is a cross-sectional view of a magnetic head representing another embodiment of the present invention.

FIG. 5 shows another embodiment of the present invention. Shown in the figure is the construction obtained by changing the one shown in FIG. 1 in the following points. First, (exciting) coils 52 and 52b provided on an area enclosed by a lower magnetic core 60 and an upper magnetic core 70 are of a construction where two layers of coil are connected in series at the ends thereof. The upper magnetic core 70 comprises an upper magnetic core front portion 71 facing the lower magnetic core 60 via a non-magnetic gap layer 51, an upper magnetic core rear portion 77 having a tip portion 78 overlapping the upper magnetic core front portion 71 and extending from the tip portion to a magnetic pole column 71b, and the magnetic pole column 71b connecting the upper magnetic core rear portion 77 to the lower magnetic core 60.

The portion corresponding to the insulating layer 54 in FIG. 1 is divided into a front insulating layer 54a and a rear insulating layer 54b. The upper magnetic core front portion 71 rides over the front insulating layer 54a. The tip of the front insulating layer 54a, that is, a boundary where the front insulating layer 54a, the non-magnetic gap layer 51 and the upper magnetic core front portion 71 come in contact with each other is an apex 73. The rear end of the front insulating layer 54a is positioned at the rear end of the upper magnetic core front portion 71. The front insulating layer 54a is formed by removing the portion of the insulating layer 54 where the upper magnetic core front portion 71 does not overlap in FIG. 1, while the rear insulating layer 54b is formed by providing an alumina film in the portion extending from the rear end of the upper magnetic core front portion 71. Provision of a rear insulating layer independently of a front insulating layer in this way is desirable in making the upper magnetic core front portion 71 flush with the magnetic pole column 71b. When subjecting the upper magnetic core front portion 71, the rear insulating layer 54b and the magnetic pole column 71b to CMP (chemical mechanical polishing) process, the top surface that is a polished surface can be finished flat, making it possible to fabricate coils with accurate shape and interval when forming more than two layers of coils.

As described in detail in the foregoing, the magnetic head according to the present invention can be manufactured without fear of fluctuations in track width in machining the air bearing surface. The present invention makes it possible to manufacture magnetic heads having high recording efficiency since magnetic leakage can be prevented and magnetic resistance or reluctance can also be reduced.

What is claimed is:

1. A magnetic head comprising:

a lower magnetic core, a non-magnetic gap layer formed on the lower magnetic core, an insulating layer formed on the non-magnetic gap layer, a coil formed on the insulating layer, a coil insulating layer covering the coil, and an upper magnetic core formed on the non-magnetic gap layer, the insulating layer and the coil insulating layer, the coil surrounding a magnetic path made of both the lower and upper magnetic cores, the upper magnetic core comprising an upper magnetic core front portion and an upper magnetic core rear portion, the upper magnetic core front portion beginning from a medium facing surface of the magnetic head and extending on the non-magnetic gap layer and on the insulating layer, the upper magnetic core rear portion having a front tip that is remote from the medium facing surface having a recess and is exposed at a bottom of the recess, contacting an upper surface of the upper magnetic core front portion and being formed beginning from the front tip and extending over the coil insulating layer, the upper magnetic core front portion
having an apex on a boundary of the upper magnetic core front portion with the insulating layer closest to the medium facing surface on the non-magnetic gap layer and
sandwiching the non-magnetic gap layer with the lower magnetic core on the medium facing surface side of the apex and the non-magnetic gap layer and the insulating layer with the lower magnetic core on the rear side of the apex, the upper magnetic core front portion
having both side walls parallel to each other in the track width direction close to the medium facing surface and on the insulating layer a sector which width in the track width direction increases from the parallel width, the front tip and the upper magnetic core rear portion on the upper magnetic core front portion being located on the medium facing surface side of the apex of the upper magnetic core front portion.

* * * * *

UNITED STATES PATENT AND TRADEMARK OFFICE
CERTIFICATE OF CORRECTION

PATENT NO. : 6,538,847 B2
DATED : March 25, 2003
INVENTOR(S) : Satoshi Meguro et al.

It is certified that error appears in the above-identified patent and that said Letters Patent is hereby corrected as shown below:

<u>Title page,</u>
Item [75], Inventors, change "Ifuka" to -- Ifuku --.

Signed and Sealed this

Fourth Day of May, 2004

JON W. DUDAS
*Acting Director of the United States Patent and Trademark Office*